United States Patent Office 3,497,006
Patented Feb. 24, 1970

3,497,006
HIGH WATER CONTENT OIL-EXTERNAL
MICELLAR DISPERSIONS
Stanley C. Jones, Littleton, and Wayne O. Roszelle, Englewood, Colo., and Marvin A. Svaldi, Robinson, Ill., assignors to Marathon Oil Company, Findlay, Ohio, a corporation of Ohio
No Drawing. Filed Dec. 26, 1967, Ser. No. 693,177
Int. Cl. E21b 43/16
U.S. Cl. 166—273                                     20 Claims

ABSTRACT OF THE DISCLOSURE

Crude oil within a subterranean formation is recovered by injecting into the formation a novel high water content oil-external micellar dispersion (containing 55% to about 90% water) and moving the micellar dispersion through the formation to displace crude oil.

BACKGROUND OF THE INVENTION

Oil-external micellar dispersions are useful in secondary-type recovery. United States Patent No. 3,254,714 to Gogarty et al. teaches the use of a microemulsion containing up to about 43% water in the recovery of crude oil. United States Patent No. 3,307,628 to Sena suggests that a microemulsion containing 55% water can be effected if the water soluble surfactant and an oil soluble surfactant are present in the correct ratios.

It has now been discovered that oil-external micellar dispersions containing from 55% up to about 90% water can be effected and used at 1–20% formation pore volumes to recover crude oil in a secondary-type recovery process.

DESCRIPTION OF THE INVENTION

The micellar dispersions of this invention are oil-external and contain at least 55% water. Water concentrations up to about 90% are useful with this invention. It is unexpected that such high water content oil-external micellar dispersions are useful to recover crude oil in a secondary-type recovery process.

Secondary-type oil recovery process, as used herein, includes a tertiary recovery process. The term "micellar dispersion" as used herein is meant to include micellar solutions, "micro-emulsions" [Schulman and Montagne, Annals of the New York Academy of Sciences, 92, pages 366–371 (1961)], "transparent" emulsions (Blair, Jr., et al., United States Patent No. 2,356,205) and micellar dispersion technology taught by C. G. Sumner, Clayton's, The Theory of Emulsions and Their Technical Treatment, 5th edition, pp. 315–320 (1954). Micellar dispersions differ from emulsions in many ways, the strongest differentiation being that the former are thermodynamically stable whereas the latter are not.

The micellar dispersions of this invention are oil-external. That is, the hydrocarbon component of the micellar dispersion is external to the aqueous component.

The micellar dispersion is composed essentially of hydrocarbon, an aqueous medium (e.g., water, brackish water and brine water), surfactant sufficient to impart desired characteristics to the dispersion, cosurfactant, and optionally, electrolyte. Examples of volume amounts are from 4 to about 40% hydrocarbon, from about 55% to about 90% aqueous medium, at least about 4% surfactant, from about 0.01% to about 20% of the cosurfactant and from about 0.001% to about 4% by weight of electrolyte. In addition, the micellar dispersion and/or subsequent slugs can contain corrosion inhibiting agents, bactericides, etc.

Examples of hydrocarbon include crude oil (both sweet and sour), partially refined fractions of crude oil and refined fractions thereof, e.g., side cuts from crude oil columns, crude column overheads, straight-run gasoline, and liquefied petroleum gases. Preferably, the hydrocarbon is crude oil or partially refined fractions thereof.

The aqueous medium can be soft water, brackish water or a brine water. Preferably, the water is soft but it can contain small amounts of salts which are characteristic of the subterranean formations being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by Du Pont Chemical Corporation, Wilmington, Del.), Energetic W-100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.) and Arquad 12–50 (a 50% active dodecyl trimethyl ammonium chloride marketed by Armour Chemical Company, Chicago, Ill.), and like materials.

Preferably, the surfactant is a petroleum sulfonate, also known as alkyl aryl naphthenic sulfonate, and preferably containing an alkali cation. Examples of preferred surfactants are the sodium and ammonium petroleum sulfonates having an average molecular weight of from about 350 to about 520, and more preferably from about 420 to about 470. The surfactant can be a mixture of low and high molecular weight sulfonates or a mixture of two or more different surfactants.

The cosurfactants or cosolubilizers useful with the invention can be partially water soluble. However, cosurfactants having 0 to infinite water solubility are useful. Preferably, they have limited water solubility, of from about 0.01% to about 20%, and more preferably, from about 1% to about 5% at ambient temperature. Examples of cosurfactants include alcohols, amino compounds, esters, aldehydes and ketones containing from 1 up to about 20 or more carbon atoms and more preferably from about 3 to about 16 carbon atoms. The cosurfactant is preferably an alcohol, e.g., isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fuel oil. Particularly useful alcohols include the primary butanols, primary pentanols and primary and secondary hexanols. Concentrations of from about 0.01% to about 20% by volume of cosurfactant are useful in the micellar dispersion and more preferably from about 0.01 to about 5.0%. Mixtures of two or more cosurfactants are useful.

Electrolytes are useful within the oil-external micellar dispersions. Examples of such electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g., sodium hydroxide, sodium chloride, sodium sulfate, hydrochloric acid, sulfuric acid, and sodium nitrate. Examples of other useful electrolytes can be found in U.S. Patent No. 3,330,343. The type and concentration of electrolyte will depend on the aqueous medium, surfactant, cosurfactant, hydrocarbon and the reservoir temperature. Generally from about 0.001% to about 4% by weight of electrolyte is useful. Micellar dispersions containing hydrophilic surfactants and high reservoir temperatures preferably dictate the use of acids or salts whereas more oleophilic surfactants prefer electrolytes having a higher pH, e.g., NaOH. The electrolyte can be the salts within brackish or brine water.

The mobility of the oil-external micellar dispersion is desirably about equal to or less than the mobility of the formation fluids (i.e., combination of crude oil and interstitial water) ahead of the dispersion. Preferably, the micellar dispersion has a mobility favorable to protecting against viscous instability.

Size of the micellar dispersion slug useful with this invention is from about 1% to about 20% formation pore volume. Larger pore volumes are useful but such may be economically unattractive. More preferably, from about 2% to about 10% formation pore volumes are useful and from about 3% to about 6% formation pore volumes give very efficient results.

The size of the mobility buffer (also identified as the front portion of the drive material) can vary from about 5% up to about 75% formation pore volume and more preferably is from about 25% to about 60% formation pore volume. However, this volume can be adjusted, i.e., increased or decreased, to satisfy the particular reservoir being flooded.

The mobility buffer should have the proper mobility to protect the micellar dispersion from invasion by the water drive, i.e., to reduce fingering tendency of the water into the micellar dispersion. Preferably, the mobility of the mobility buffer is about equal to or less than that of the micellar dispersion. From about 5% to about 100% of the mobility buffer can have graded mobilities from a low of the micellar dispersion to a high of the water drive.

After the mobility buffer is injected into the subterranean formation, sufficient water drive is injected to move or displace the micellar dispersion and mobility buffer toward a production well in fluid communication with the subterranean reservoir. Displaced crude oil is recovered at the production well.

The following examples are presented to illustrate working embodiments of the invention. Unless otherwise specified, percents are based on volume.

EXAMPLE 1

This example is presented to show that different components within the micellar dispersion and different amounts thereof can be used to obtain stable oil-external micellar dispersions. Examples indicated in Table I are prepared at room temperature with minimal agitation. The compositions of the micellar dispersions are indicated in Table I:

TABLE I

| Sample | Surfactant Percent | Surfactant Type | Hydrocarbon Percent | Hydrocarbon Type | Aqueous Medium Percent | Aqueous Medium Type | Cosurfactant ml./100ml. | Cosurfactant Type |
|---|---|---|---|---|---|---|---|---|
| A | 5.2 | Ammonium petroleum sulfonate (average MW=440, 81% active) | 24.75 | Crude oil | 70 | 60% Henry plant water [1] / 40% Palestine water [2] | 0.08 / 0.25 | n-Amyl alcohol / Isopropanol |
| B | 10 | Pyronate 50 [3] | 20 | do | 70 | 60% Henry plant water / 40% Palestine water | 3.25 | n-Hexanol |
| C | 10 | Petronate L [4] | 20 | Straight-run gasoline | 70 | 60% Henry plant water / 40% Palestine water | 4.24 | n-Amyl alcohol |
| D | 20 | Duponol WAQE | 10 | do | 70 | Distilled water | 14 | i-Amyl alcohol |
| E | 10 | Energetic W-100 | 20 | do | 70 | do | 8.5 | Do. |
| F | 10 | Triton X-100 | 20 | do | 70 | do | 5.5 | Do. |
| G | 20 | Arquad 12-50 | 10 | do | 70 | do | 17.0 | Do. |
| H | 16.6 | Sodium petroleum sulfonate (avg. MW=465, 62% active) | 16.6 | do | 66.6 | do | 1.3 | Isopropanol |
| I | 10 | Ammonium petroleum sulfonate (avg. MW=440, 81% active) | 5 | Crude oil | 85 | 60% Palestine water / 40% Henry plant water | 2.5 | n-Amyl alcohol |

[1] Henry plant water is obtained from the Henry lease in Illinois; contains about 18,000 p.p.m. of dissolved salts and hereinafter is identified as Henry plant water.
[2] Palestine water is obtained from the Palestine water reservoir in Palestine, Illinois; contains about 420 p.p.m. of dissolved salts and hereinafter is identified as Palestine water.
[3] Pyronate 50, a sodium petroleum sulfonate, average molecular weight 350. Sold by Sonneborn Chemical Co., 300 Park Avenue South, New York, New York, 10010.
[4] Petronate L, a sodium petroleum sulfonate, average molecular weight 422. Sold by Sonneborn Chemical Co., 300 Park Avenue South, New York, New York, 10010.

The amount of cosurfactant is based on ml. of cosurfactant per 100 ml. of liquid containing surfactant, hydrocarbon and aqueous medium.

EXAMPLE 2

Fired Berea sandstone cores 4 feet long by 3 inches in diameter are saturated with distilled water containing 18,000 p.p.m. of sodium chloride, flooded to irreducible water saturation with Henry crude oil (a sweet, black oil having a viscosity of about 7 cps. at 72° F.) and then reduced to residual oil saturation by waterflooding with Henry plant water. The characteristics of the cores are indicated in Table III. Thereafter, there is injected into the core Table III indicated percent formation pore volumes of micellar dispersion. The compositions of these micellar dispersions are given in Table II:

TABLE II.—MICELLAR DISPERSION COMPOSITION

| Sample | Hydrocarbon (crude oil) (percent) | Surfactant (petroleum sulfonate, percent) | Water (percent) | Cosurfactant (percent) |
|---|---|---|---|---|
| A | 28.70 | 9.10 | 60.73 (60PW/40HPW)[1] | 0.99 NAA[2] / 0.48 IPA[3] |
| B | 28.52 | 8.75 | 61.00 (60PW/40HPW) | 1.26 PAA[4] / 0.47 IPA |
| C | 18.07 | 8.60 | 71.50 (PW) | 1.77 NAA / .06 IPA |
| D | 12.93 | 8.70 | 76.06 (PW) | 2.25 NAA / .06 IPA |
| E | 9.20 | 8.74 | 80.72 (60PW/40HPW) | 0.89 NAA / 0.45 IPA |

[1] In the water column, HPW is Henry plant water and PW is Palestine water.
[2] NAA is n-amyl alcohol.
[3] IPA is isopropanol.
[4] PAA is primary amyl alcohol.

The micellar dispersions are followed by the injection of 1.2 pore volumes of a mobility buffer slug composed of 1200 p.p.m. of No. 530 Pusher (a high molecular weight partially hydrolyzed polyacrylamide marketed by Dow Chemical Company), 1 percent fusel oil, and the residue Palestine water. Flooding of the core samples is effected at 72° F., results of the flooding tests are indicated in Table III:

TABLE III

| Sample | Core Characteristics Effective Porosity (Percent) | Core Characteristics Permeability (md.) | Core Characteristics Residual Oil Saturation (Percent) | Micellar Dispersion Type | Micellar Dispersion Percent Formation Pore Volume Injected | Percent Crude Oil Recovery |
|---|---|---|---|---|---|---|
| A-1 | 17.6 | 114 | 34.7 | A | 1 | 40.3 |
| A-2 | 17.9 | 114 | 37.1 | A | 2 | 81.2 |
| A-3 | 20.1 | 561 | 34.4 | A | 4.1 | 91.5 |
| B-1 | 22.1 | 855 | 35.9 | B | 5 | 89.9 |
| C-1 | 18.8 | 165 | 36.6 | C | 2.5 | 90.9 |
| D-1 | 17.2 | 72 | 37.3 | D | 2 | 60.0 |
| D-2 | 18.7 | 154 | 36.1 | D | 5 | 100.0 |
| E-1 | 21.1 | 642 | 35.9 | E | 5 | 82.7 |

What is claimed is:

1. A process of recovering crude oil from an oil-bearing subterranean formation having at least one injection means in fluid communication with at least one production means, comprising injecting into the formation an oil-external micellar dispersion containing from about 55% to about 90% by volume of water, and moving said micellar dispersion through the subterranean formation and recovering crude oil through the production well.

2. The process of claim 1 wherein the micellar dispersion is comprised of hydrocarbon, water, surfactant, and cosurfactant.

3. The process of claim 2 wherein the micellar dispersion contains electrolyte.

4. The process of claim 1 wherein from 1 to about 20% formation pore volume of the micellar dispersion is injected into the formation.

5. The process of claim 1 wherein the micellar dispersion contains at least about 4% surfactant.

6. The process of claim 1 wherein a mobility buffer is injected into the formation after the micellar dispersion is injected therein.

7. The process of claim 6 wherein the mobility buffer has a mobility about equal to or less than that of the micellar dispersion.

8. The process of claim 6 wherein a water drive is injected into the subterranean formation after the mobility buffer to displace the micellar dispersion and mobility buffer toward the production means.

9. The process of claim 1 wherein the micellar dispersion has a mobility about equal to or less than that of the formation fluids flowing ahead of the micellar dispersion within the subterranean formation.

10. A process of recovering crude oil from an oil-bearing subterranean formation having at least one injection means in fluid communication with at least one production means, comprising:
   (1) injecting an oil-external micellar dispersion comprised of from about 4% to about 40% of hydrocarbon, from about 55% to about 90% of water, at least about 4% of surfactant, and from about 0.01% to about 5% of cosurfactant, the percents based on volume, then
   (2) injecting a mobility buffer into the subterranean formation, and
   (3) injecting sufficient water drive into the subterranean formation to move the micellar dispersion and mobility buffer through the formation and recovering displaced crude oil through the production means.

11. The process of claim 10 wherein from about 1% to about 20% formation pore volume of the micellar dispersion is injected into the subterranean formation.

12. The process of claim 11 wherein from about 2% to about 10% formation pore volume of the micellar dispersion is injected into the subterranean formation.

13. The process of claim 10 wherein the micellar dispersion has a mobility about equal to or less than that of the formation fluids flowing ahead of the micellar dispersion within the subterranean formation.

14. The process of claim 10 wherein from about 5% to about 75% formation pore volume of the mobility buffer is injected into the subterranean formation.

15. The process of claim 10 wherein the mobility buffer has a mobility about equal to or less than that of the micellar dispersion.

16. The process of claim 10 wherein from about 5% to 100% of the mobility buffer is characterized as having graded mobilities increasing from front to rear from about that of the micellar dispersion to about that of the water drive.

17. The process of claim 10 wherein the mobility buffer is characterized as having an average mobility between about that of the micellar dispersion and about that of the water drive.

18. A process of recovering crude oil from an oil-bearing subterranean formation having at least one injection means in fluid communication with at least one production means, comprising:
   (1) injecting into the formation from 1% to about 20% formation pore volume of a micellar dispersion consisting essentially of from about 4% to about 40% by volume of hydrocarbon, at least about 4% by volume of petroleum sulfonate, from about 55% to about 90% by volume of water, from about 0.01% to about 5% by volume of an alcohol(s) containing from about 3 to about 20 carbon atoms, and from about 0.001% to about 4% by weight of electrolyte, then
   (2) injecting into the formation from about 5% to about 75% formation pore volume of a mobility buffer, the front portion of the mobility buffer characterized as having a mobility about equal to or less than that of the micellar dispersion, and,
   (3) injecting sufficient water drive into the formation to move the micellar dispersion and mobility buffer through the formation and recovering displaced crude oil through the production means.

19. The process of claim 18 wherein the mobility of the micellar dispersion is about equal to or less than that of the formation fluids within the subterranean formation.

20. The process of claim 18 wherein from about 5% to about 100% of the mobility buffer is characterized as having mobilities increasing from a low of the micellar dispersion to a high of the water drive.

References Cited

UNITED STATES PATENTS

| | | | |
|---|---|---|---|
| 3,149,669 | 9/1964 | Binder et al. | 166—9 |
| 3,254,714 | 6/1966 | Gogarty et al. | 166—9 |
| 3,261,399 | 7/1966 | Coppel | 166—9 |
| 3,266,570 | 8/1966 | Gogarty | 166—9 |
| 3,373,809 | 3/1968 | Cooke | 166—9 |

STEPHEN J. NOVOSAD, Primary Examiner

U.S. Cl. X.R.

166—275

PO-1050
(5/69)

UNITED STATES PATENT OFFICE
CERTIFICATE OF CORRECTION

Patent No. 3,497,006      Dated February 24, 1970

Inventor(s) Stanley C. Jones, Wayne O. Roszelle, and Marvin A. Svaldi

It is certified that error appears in the above-identified patent and that said Letters Patent are hereby corrected as shown below:

Column 2, line 56:      Delete "fuel" and insert --fusel--.

Table I, heading:      Delete "Yype" and insert --Type--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents